United States Patent
Yoneyama et al.

(10) Patent No.: US 9,987,598 B2
(45) Date of Patent: Jun. 5, 2018

(54) METHOD OF PRODUCING COMPOSITE FOR ACID GAS SEPARATION

(71) Applicant: FUJIFILM Corporation, Tokyo (JP)

(72) Inventors: Satoshi Yoneyama, Kanagawa-ken (JP); Yoshihiro Aburaya, Kanagawa-ken (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 201 days.

(21) Appl. No.: 14/862,577

(22) Filed: Sep. 23, 2015

(65) Prior Publication Data

US 2016/0008768 A1  Jan. 14, 2016

Related U.S. Application Data

(63) Continuation of application No. PCT/JP2014/001799, filed on Mar. 27, 2014.

(30) Foreign Application Priority Data

Mar. 29, 2013 (JP) .................................. 2013-072017

(51) Int. Cl.
  *B01D 69/12* (2006.01)
  *B01D 71/02* (2006.01)
  (Continued)

(52) U.S. Cl.
  CPC ........... *B01D 69/12* (2013.01); *B01D 53/228* (2013.01); *B01D 67/0088* (2013.01);
  (Continued)

(58) Field of Classification Search
  None
  See application file for complete search history.

(56) References Cited

U.S. PATENT DOCUMENTS

| 5,445,669 A | 8/1995 | Nakabayashi et al. |
| 2008/0241503 A1 | 10/2008 | Romdhane et al. |

(Continued)

FOREIGN PATENT DOCUMENTS

| JP | 62-140620 A | 6/1987 |
| JP | 7-102310 B2 | 11/1995 |

(Continued)

OTHER PUBLICATIONS

Communication dated Jun. 3, 2016, from the State Intellectual Property Office of People's Republic of China in counterpart application No. 201480018309.1.

(Continued)

*Primary Examiner* — Shamim Ahmed
*Assistant Examiner* — Bradford M Gates
(74) *Attorney, Agent, or Firm* — Sughrue Mion, PLLC (57) ABSTRACT

Preparing forming coating liquid for an acid gas separation facilitated transport membrane which includes a hydrophilic compound, an acid gas carrier, and water, coating the forming coating liquid, using a layered film layered in the order of a hydrophilic porous film, a hydrophobic porous film, and an auxiliary support film as a porous support, on a surface of the hydrophilic porous film of the layered film with a liquid film thickness of 0.3 mm to 1.0 mm and drying the coated liquid to form a first acid gas separation facilitated transport membrane, and further coating the forming coating liquid for the acid gas separation facilitated transport membrane on the surface of the hydrophilic porous film with the previously formed acid gas separation facilitated transport membrane and drying the coated liquid to form a next acid gas separation facilitated transport membrane.

5 Claims, 4 Drawing Sheets

(51) Int. Cl.
  *B01D 71/38* (2006.01)
  *B01D 71/40* (2006.01)
  *B01D 53/22* (2006.01)
  *B01D 67/00* (2006.01)
  *B01D 69/10* (2006.01)
  *B01D 69/14* (2006.01)

(52) U.S. Cl.
  CPC ........... *B01D 69/10* (2013.01); *B01D 69/142* (2013.01); *B01D 71/02* (2013.01); *B01D 71/38* (2013.01); *B01D 71/40* (2013.01); *B01D 2256/16* (2013.01); *B01D 2256/20* (2013.01); *B01D 2257/304* (2013.01); *B01D 2257/504* (2013.01); *B01D 2323/42* (2013.01); *B01D 2325/04* (2013.01); *B01D 2325/36* (2013.01); *B01D 2325/38* (2013.01)

(56) References Cited

U.S. PATENT DOCUMENTS

| | | |
|---|---|---|
| 2011/0036237 A1 | 2/2011 | Okada et al. |
| 2012/0297976 A1 | 11/2012 | Sano |
| 2013/0284022 A1 | 10/2013 | Hiraki et al. |
| 2013/0284663 A1 | 10/2013 | Lee et al. |
| 2013/0287958 A1 | 10/2013 | Oouchi |

FOREIGN PATENT DOCUMENTS

| | | |
|---|---|---|
| JP | 9299772 A | 11/1997 |
| JP | 10-28851 A | 2/1998 |
| JP | 2010522807 A | 7/2010 |
| JP | 2010-279885 A | 12/2010 |
| JP | 2011-183379 A | 9/2011 |
| JP | 2012-143711 A | 8/2012 |
| JP | 2013-22581 A | 2/2013 |
| JP | 2013027850 A | 2/2013 |
| WO | 2009/093666 A1 | 7/2009 |
| WO | 2012/096055 A1 | 7/2012 |
| WO | 2012173417 A2 | 12/2012 |

OTHER PUBLICATIONS

Communication dated Nov. 1, 2016, from the Japanese Patent Office in counterpart application No. 2013-072017.
Communication dated Dec. 7, 2016 from the State Intellectual Property Office of the P.R.C. In counterpart application No. 201480018309.1.
International Search Report for PCT/JP2014/001799 dated Aug. 19, 2014.
Written Opinion for PCT/JP2014/001799 dated Aug. 19, 2014.
Communication dated May 17, 2016 from the Japanese Patent Office in counterpart application No. 2013-072017.
Communication dated May 27, 2017, from the Chinese Patent Office in counterpart Chinese application No. 201480018309.1.

METHOD OF PRODUCING COMPOSITE FOR ACID GAS SEPARATION

CROSS-REFERENCE TO RELATED APPLICATIONS

This application is a Continuation of PCT International Application No. PCT/JP2014/001799 filed on Mar. 27, 2014, which claims priority under 35 U.S.C. § 119 (a) to Japanese Patent Application No. 2013-072017 filed on Mar. 29, 2013. Each of the above applications is hereby expressly incorporated by reference, in its entirety, into the present application.

BACKGROUND

The present disclosure relates to a method of producing a composite for acid gas separation having an acid gas separation function.

Recently, development of technologies for selectively separating acid gases in mixed gases has been in progress. In particular, development of technologies for selectively separating carbon dioxide have been making progress. Such developments include, for example, a technology for collecting and concentrating carbon dioxide in exhaust gases as a countermeasure against global warming, and a technology for obtaining a hydrogen-based gas for use in fuel cells and the like by steam reforming hydrocarbons to hydrogen and carbon monoxide (CO), then generating carbon dioxide and hydrogen by reacting the carbon monoxide and water vapor, and eliminating the carbon dioxide through a membrane that selectively permeates the carbon dioxide.

As an acid gas separation membrane that selectively permeates and separates an acid gas, a facilitated transport membrane is known in which an acid gas is separated by transporting the acid gas from the raw gas feed side of the membrane to the opposite side by an acid gas carrier contained in the membrane.

For example, Japanese Examined Patent Publication No. 7(1995)-102310 describes a manufacturing method of a composite for carbon dioxide separation in which uncrosslinked vinyl alcohol-acrylate copolymer solution is coated in a film on a carbon dioxide permeable support to form a liquid film of the uncross-linked vinyl alcohol-acrylate copolymer solution on the support, then the liquid film is heated to cause cross-linking to produce a water insoluble film, and an aqueous solution containing carbon dioxide carrier (substance having affinity to carbon dioxide) is absorbed in the water insoluble film to produce a hydrogel film, thereby forming a facilitated transport membrane formed of the hydrogel film supported on the support as the composite for carbon dioxide separation.

Japanese Unexamined Patent Publication No. 2012-143711 describes a manufacturing method of a composite for carbon dioxide separation in which an coating liquid prepared by adding a gelling agent, such as agar, to an coating liquid containing a polyvinyl alcohol-polyacrylic acid copolymer and alkali metal carbonate and heating at a temperature greater than or equal to 50° C. is coated on a support, and the liquid film is cooled to be gelated and dried, thereby forming a facilitated transport membrane supported on the support as the composite for carbon dioxide separation.

Japanese Unexamined Patent Publication No. 2011-183379 describes a manufacturing method of a composite for acid gas separation having a gas separation membrane formed by coating a coating liquid to a layered film formed by layering a hydrophilic porous film and a hydrophobic porous film and permeating the coating liquid to a portion of the porous film.

SUMMARY

Japanese Examined Patent Publication No. 7(1995)-102310 assumes that the thickness of the gel film is about 1 to 200 µm, and Japanese Unexamined Patent Publication No. 2012-143711 assumes that a facilitated transport membrane is formed with a thickness of 5 to 50 µm by coating the liquid film with a thickness of less than or equal to 1 mm and drying for gelling. Japanese Unexamined Patent Publication No. 2011-183379 assumes 0.01 to 200 µm as the film thickness of the separation active layer (facilitated transport membrane).

In the meantime, in a case where carbon dioxide is separated from a mixed gas of carbon dioxide and hydrogen, the facilitated transport membrane for separating carbon dioxide actively permeates carbon dioxide by chemical reaction while the hydrogen is permeated by being dissolved and diffused on the surface of the membrane. Hence, the facilitated transport membrane is "the thicker the better" from the viewpoint of reducing the permeability of hydrogen. Further, for the method of forming the aforementioned gel film on a support by coating and drying, the gel film is sensitive to a foreign object on the surface of the support if the film thickness is thin, and a defect, such as a pinhole or the like, may possibly occur in the gel film.

In view of these circumstances, a demand exists for a facilitated transport membrane which is thicker than those of Japanese Examined Patent Publication No. 7(1995)-102310, Japanese Unexamined Patent Publication No. 2012-143711, and Japanese Unexamined Patent Publication No. 2011-183379. But, it is revealed by the study of the present inventors that, if a liquid film is simply coated thick when coating the liquid film on a support, for example, coating and drying a thick liquid film thicker than 3 mm, scaly unevenness membrane surface and uneven distribution of carries and polymer occur due to a large difference in drying process between the surface side and support side of the membrane. Further, the manufacturing process requires a coater with a drying furnace designed very long, thereby posing a problem of requiring new equipment.

The present disclosure has been developed in view of the circumstances described above, and the present disclosure provides a method of producing a composite for acid gas separation with a thick facilitated transport membrane.

A method of producing a composite for acid gas separation of the present disclosure is a method of producing a composite for acid gas separation with an acid gas separation facilitated transport membrane having a function of separating an acid gas in a raw gas on a porous support, the method including:

a coating liquid preparation step in which a forming coating liquid for the acid gas separation facilitated transport membrane is prepared, the forming coating liquid including a hydrophilic compound, an acid gas carrier, and water;

an initial layer forming step in which a first acid gas separation facilitated transport membrane is formed by coating the forming coating liquid, using a layered film layered in the order of a hydrophilic porous film, a hydrophobic porous film, and an auxiliary support film as the porous support, on a surface of the hydrophilic porous film of the layered film with a liquid film thickness of 0.3 mm to 1.0 mm and drying the coated coating liquid; and a next layer forming step in which a next acid gas separation facilitated transport membrane is formed by further coating the forming coating liquid for the acid gas separation facilitated transport membrane on the surface of the hydrophilic porous film with the previously formed acid gas separation facilitated transport membrane and drying the coated coating liquid, the next layer forming step being performed once or more times.

The forming coating liquid for the acid gas separation facilitated transport membrane preferably has a temperature of 15° C. to 35° C. and a viscosity measurement value of 0.5 Pa·s to 5 Pa·s in B-type viscosity measurement at a rotation speed of 60 rpm.

The forming coating liquid for the acid gas separation facilitated transport membrane is preferably coated with a liquid film thickness of less than or equal to 3.0 mm in the next layer forming step.

A roll coating method or a blade coating method is preferably used to perform the coating.

The hydrophilic compound is preferably a polyvinyl alcohol-polyacrylic acid copolymer.

The acid gas carrier preferably includes a compound containing at least one selected from alkali metal carbonates.

In the method of producing a composite for acid gas separation of the present disclosure, a plurality of forming coating liquids which differ in concentration of the acid gas carrier may be prepared as the forming coating liquid for the acid gas separation facilitated transport membrane in the coating liquid preparation step, and a next layer acid gas separation facilitated transport membrane may be formed using a forming coating liquid which differs in concentration of the acid gas carrier from the forming coating liquid used for the previously formed acid gas separation facilitated transport membrane in the next layer forming step. The use of a forming coating liquid having a low concentration of the acid gas carrier is more preferable from the viewpoint of film strength and salting out.

Further, a plurality of forming coating liquids which differ in hydrophilic compound may be prepared as the forming coating liquid for the acid gas separation facilitated transport membrane in the coating liquid preparation step, and a next layer acid gas separation facilitated transport membrane may be formed using a forming coating liquid which differs in hydrophilic compound from the forming coating liquid used for the previously formed acid gas separation facilitated transport membrane in the next layer forming step. The term "differ in hydrophilic compound" as used herein includes, for example, copolymers consisting of monomers of the same type but differs in the copolymerization ratio, other than those having different constituent substances. For example, if the hydrophilic compound of the forming coating liquid for the first acid gas separation facilitated transport membrane is a polyvinyl alcohol-polyacrylic acid copolymer, this includes the use of a hydrophilic compound containing a polyvinyl alcohol-polyacrylic acid copolymer with a different copolymerization ratio as the forming coating liquid for the acid gas separation facilitated transport membrane of the next layer.

Note that forming coating liquids which differ in the amount of additives, such as a thickener, an additive agent, and the like, may be prepared in the preparation step of forming coating liquid for the acid gas separation facilitated transport membrane, and different forming coating liquids may be used at the time of forming the first acid gas separation facilitated transport membrane and at the time of forming the next layer acid gas separation facilitated transport membrane. Further, forming coating liquids which differ in two or more of concentration of acid gas carrier, concentration of hydrophilic compound, and concentration of additive amount, such as a thickener, an additive agent, and the like, may be prepared, and different forming coating liquids may be used at the time of forming the first acid gas separation facilitated transport membrane and at the time of forming the next layer acid gas separation facilitated transport membrane. In a case where three or more layers of acid gas separation facilitated transport membranes are formed, the first and the second layers may be formed by the same forming coating liquid and the third layer may be formed by a different forming coating liquid.

According to the method of producing a composite for acid gas separation of the present disclosure, a thick acid gas separation composite membrane without any film defect may be obtained, because the acid gas separation facilitated transport membrane is formed on the support by repeating liquid film coating and drying a plurality of times through the initial layer forming step and the next layer forming step performed once or more times.

Further, even if a defect occurs in the initial layer due to a foreign object on the surface of the support or a transfer failure at the time of coating when forming the initial layer, the defect may be filled in the next layer forming step. This allows a facilitated transport membrane having less defects to be obtained.

When the forming coating liquid for the acid gas separation facilitated transport membrane is coated on the hydrophilic porous film of the porous support, the coating liquid infiltrates into the pores of the hydrophilic porous film right after the coating. At this time, the air in the pores needs to be replaced by the coating liquid. If the coating liquid is coated with a liquid film of greater than 1.0 mm, the liquid film is dried before the air in the pores comes out to the surface, and a facilitated transport membrane with many bubbles is formed, thereby resulting in an insufficient film strength or a possible gas leakage with the bubbles as the origin. But the present disclosure may obtain a facilitated transport membrane with less bubbles, since the initial layer is coated with a liquid film of less than 1.0 mm.

Further, in a case where a composite for acid gas separation is produced by a roll-to-roll process, if a thick film is tried to be formed by one coating and drying step as in the past, strong curling occurs in the composite due to contraction in a width direction of the support arising from the drying of the facilitated transport membrane. But, according to the production method of the present disclosure, the occurrence of curling may be suppressed, because a thick film is gradually formed through a plurality of coating and drying steps.

DETAILED DESCRIPTION OF THE PREFERRED EMBODIMENTS

Hereinafter, embodiments of the present disclosure will be described with reference to the accompanying drawings.
<Method of Producing Composite for Acid Gas Separation>

A method of producing a composite for acid gas separation of the present disclosure includes a coating liquid preparation step in which a forming coating liquid for the acid gas separation facilitated transport membrane is prepared, the forming coating liquid including a hydrophilic compound, an acid gas carrier, and water, an initial layer forming step in which a first acid gas separation facilitated transport membrane is formed by coating the forming coating liquid, using a layered film layered in the order of a hydrophilic porous film, a hydrophobic porous film, and an auxiliary support film as the porous support, on a surface of the hydrophilic porous film of the layered film with a liquid film thickness of 0.3 mm to 1.0 mm and drying the coated coating liquid, and a next layer forming step in which a next acid gas separation facilitated transport membrane is formed by further coating the forming coating liquid for the acid gas separation facilitated transport membrane on the surface of the hydrophilic porous film with the previously formed acid gas separation facilitated transport membrane and drying the coated coating liquid, the next layer forming step being performed once or more times.

The composite for acid gas separation of the present disclosure has a function of separating at least one kind of acid gas from a gas mixture containing at least one kind of acid gas and at least one kind of non-acid gas. Here, acid gases may include carbon dioxide, hydrogen sulfide, carbonyl sulfide, sulfur oxides (SOx), nitride oxides (NOx), and the like, while the non-acid gases may include hydrogen, methane, nitrogen, carbon monoxide, and the like. In particular, the composite for acid gas separation is preferably used for separating carbon dioxide from a raw gas containing mainly the carbon dioxide and methane or from a raw gas containing mainly the carbon dioxide and hydrogen.

Figure 1:
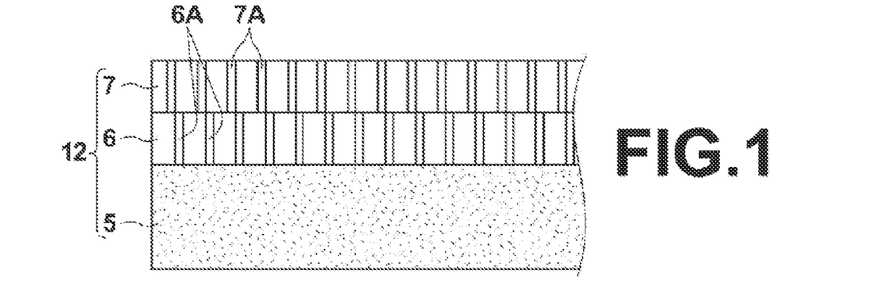
FIG. 1 illustrates a production step of a composite for acid gas separation according to the present disclosure.

The porous support is provided to support the acid gas separation facilitated transport membrane and has acid gas permeability. It allows for coating of a forming composition (coating liquid) for an acid gas separation facilitated transport membrane to form an acid gas separation facilitated transport membrane and is also capable of supporting the membrane. Here, as illustrated in FIG. 1, a layered film layered in the order of a hydrophilic porous film 7, a hydrophobic porous film 6, and an auxiliary support film 5 is used as a support 12.

As the hydrophilic porous film 7, polysulfone, cellulose membrane filter film, polyamide, interfacial polymerization thin film of polyimide, polytetrafluoroethylene, stretched porous film of high molecular weight polyethylene have a high porosity and small diffusion inhibition of acid gases (in particular, carbon dioxide), and are preferable from the viewpoint of strength and manufacturing suitability. Further, the hydrophilic porous film 7 is preferably formed of a material having heat resistance and less hydrolyzable. A stretched membrane of polytetrafluoroethylene (PTFE) is particularly preferable. Still further, the hydrophilic porous membrane may be obtained by hydrophilizing each porous film. Hydrophilizing methods may include plasma treatment, corona discharge treatment, UV treatment, radiation treatment, and the like. Further, a hydrophobic porous film may be hydrophilized by coating a hydrophilic resin to form a core-sheath structure with the hydrophobic porous film being the core and the hydrophilic resin being the sheath. The maximum pore diameter of the pores is preferably less than or equal to 1 μm. From the viewpoint that the passage of gas should not be interfered in the gas passing area, the average core diameter of the pores of the porous support is preferably 0.001 μm to 10 μm, more preferably 0.002 μm to 5 μm, and particularly preferably 0.005 μm to 1 μm.

As the hydrophobic porous film 6, polysulfone, cellulose membrane filter film, polyamide, interfacial polymerization thin film of polyimide, poly tet-fluoroethylene, stretched porous film of high molecular weight polyethylene have a high porosity and small diffusion inhibition of acid gases (in particular, carbon dioxide), and are preferable from the viewpoint of strength and manufacturing suitability. Further, the hydrophobic porous film 6 is preferably formed of a material having heat resistance and less hydrolyzable. A stretched membrane of polytetrafluoroethylene (PTFE) is particularly preferable. Still further, a hydrophilic porous film may be hydrophobized by coating a hydrophobic resin to form a core-sheath structure with the hydrophilic porous film being the core and the hydrophobic resin being the sheath.

The hydrophobic porous film 6 has a function to prevent the facilitated transport membrane containing moisture under the use environment from permeating from the side of the hydrophilic porous film 7 to the side of the auxiliary support film 5. Provision of the hydrophobic porous film 6 may prevent performance degradation arising from film thickness distribution and aging. The maximum pore diameter of the pores is preferably less than or equal to 1 μm. From the viewpoint that sufficient adhesive agent is infiltrated in the adhesive application area while the gas passage is not interfered in the gas passing area, the average core diameter of the pores of the porous support is preferably 0.001 μm to 10 μm, more preferably 0.002 μm to 5 μm, and particularly preferably 0.005 μm to 1 μm.

The maximum pore diameter as used herein refers to the value measured and calculated by the bubble point method. For example, the maximum pore diameter may be measured by the bubble point method (conforms to JIS K 3832) using Palm Polo meter manufactured by PMI as measuring equipment.

The auxiliary support film 5 is provided to reinforce the porous films 6 and 7, and there is not any specific restriction on the material as long as it has good strength, stretch resistance, and gas permeability, and nonwoven fabrics, woven fabrics, nets, meshes with an average pore diameter of 0.001 μm to 10 μm, and the like may be used through a proper selection.

Similarly, the auxiliary support film 5 is preferably formed of a material having heat resistance and less hydrolyzable, as in the foregoing porous film 6. As the fibers constituting nonwoven fabrics, woven fabrics, and knitted fabrics, those made of polypropylene, modified polyamide, such as Aramid (trade name), polytetrafluoroethylene, and fluorine-containing resin, such as polyvinylidene fluoride are preferably used as they have excellent durability and heat resistance. Identical materials are preferably used as the resin materials constituting meshes. The use of a nonwoven fabric made of polypropylene (PP) which is inexpensive and has a strong mechanical strength is particularly preferable.

The provision of the auxiliary support film 5 may increase the mechanical strength, which may provide an advantageous effect that the support film is not wrinkled even when handled in a roll-to-roll coater, whereby productivity is increased.

For the support 12, the use of a hydrophilic PTFE, as the hydrophilic porous film 7, a PTFE, as the hydrophobic porous film 6, and a nonwoven fabric made of inexpensive and mechanically strong polypropylene (PP), as the auxiliary support film 5 is particularly preferable.

The term "hydrophilic porous film" as used herein refers to a porous film which is hydrophilic in at least one surface on which the forming coating liquid for the facilitated transport membrane is coated. The term "hydrophilic" as used herein refers to that the contact angle of water is less than or equal to 90° at room temperature (25° C.).

The term "hydrophobic porous film" as used herein refers to a porous film which is hydrophobic in at least one surface in contact with the hydrophilic porous film. Provision of the hydrophobic porous film 6 between the hydrophilic porous film 7 and the auxiliary support film 5 may prevent performance degradation of the facilitated transport membrane that contains moisture under the use environment arising from film thickness distribution and aging. The term "hydrophobic" as used herein refers to that the contact angle of water is greater than 90° at room temperature (25° C.).

The support 12 will have a trouble in strength if it is too thin. Preferably, the hydrophilic porous film has a film thickness of 3 to 100 μm, the hydrophobic porous film has a film thickness of about 5 to 100 μm, and the auxiliary support film has a film thickness of about 50 to 300 μm.

—Preparation Step of Acid Gas Separation Layer Forming Coating Liquid—

In the coating liquid preparation step, an acid gas separation layer forming coating liquid which include a hydrophilic compound, an acid gas carrier, and water is prepared. The coating liquid is prepared by adding appropriate amounts of hydrophilic polymer, which is a hydrophilic compound, and an acid gas carrier, and other additives, as required, such as a thickener, a cross-linking agent, to water (room temperature water or heated water), sufficiently agitating, and heating while agitating to promote the dissolution, as required. Note that the hydrophilic polymer and the acid gas carrier may be added separately to the water or a mixture thereof mixed in advance may be added to the water. For example, in a case where a thickener is included, the thickener is added to water and dissolved first and then the hydrophilic polymer and the acid gas carrier are gradually added and agitated, whereby the deposition (salting out) of the hydrophilic polymer and the thickener may be prevented effectively.

At the time of coating, the coating liquid has a temperature of 15° C. to 35° C. and a viscosity measurement value of 0.5 Pa·s to 5 Pa·s measured by a B-type viscometer at a rotation speed of 60 rpm at that temperature. The viscosity of the coating liquid before coating is preferably 0.5 Pa·s to 2 Pa·s (500 to 2000 cp) and more preferably 1 Pa·s to 2 Pa·s (1000 to 2000 cp) from the viewpoint of surface property and high speed. The viscosity at this time is the value measured by a B-type viscometer at 60 rpm and at a liquid temperature of 25° C. A viscosity greater than or equal to 0.5 Pa·s allows for a uniform film thickness by preventing the film flowing after coating. Generally, the viscosity decreases with the increase in temperature and increases with the decrease in temperature. Here, it means that if the coating liquid has a viscosity in the aforementioned viscosity range at a liquid temperature of 25° C., the coating liquid is suitable for coating under the normal environment (about 10° C. to 35° C.).

The verification as to whether or not the prepared acid gas separation facilitated transport membrane forming coating liquid shows any viscosity within the viscosity measurement range of 0.5 Pa·s to 5 Pa·s in B-type viscosity measurement at a rotation speed of 60 rpm at any temperature in the range of 15° C. to 35° C. may be made in the following manner. That is, the prepared acid gas separation facilitated transport membrane forming coating liquid is poured into a stainless container (e.g., inner diameter 4 cm, height 12 cm) such that a viscometer cylinder (rotor) is sufficiently immersed in the coating liquid. The stainless container is immersed into a temperature-controllable water bath and, while controlling the temperature of the coating liquid in the range of 15° C. to 35° C., a B-type viscometer (BL2 1~100,000 mPa·s/KN3312481, manufactured by Tech Jam Co., Ltd.) is operated to read the value with respect to each temperature at a rotation speed of 60 rpm, whereby the viscosities of the coating liquid are measured in accordance with JIS Z 8803.

—Initial Layer Forming Step and Next Layer Forming Step—

The method of producing a composite for acid gas separation of the present disclosure is suitable for use in the manufacture by a roll-to-roll coater that uses a strip-like (web-like) support in coating and drying steps of the coating liquid. There is not any specific restriction on the coating method as long as it is capable of coating the coating liquid having a foregoing viscosity with a foregoing thickness. Because of high viscosity and thickness, a post measuring method, such as a roll coating method or a blade coating method, in which a large amount of coating liquid is transferred to the support and immediately after that the transferred coating liquid is adjusted to a desired thickness by a latter mechanism is most suited. Other coating methods that may be employed include extrusion coating, dip coating, bar coating, curtain coating, and the like. Further, a plurality of coating methods may be combined. The roll coating method and the blade coating method are preferable also from the viewpoint that the manufacturing facility is inexpensive.

Figure 2:
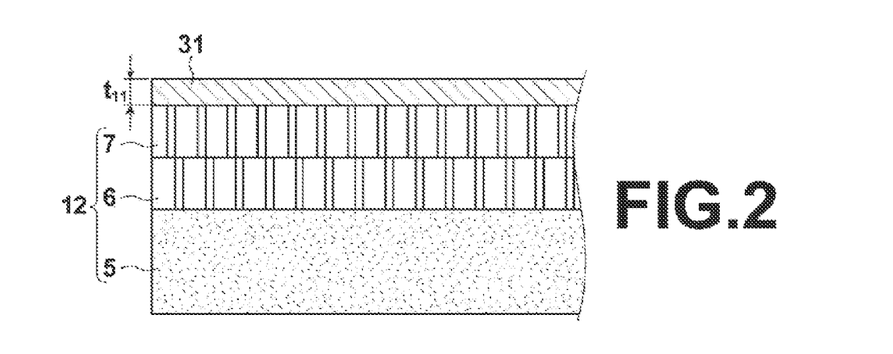
FIG. 2 illustrates a production step of the composite for acid gas separation following FIG. 1.
Figure 3:
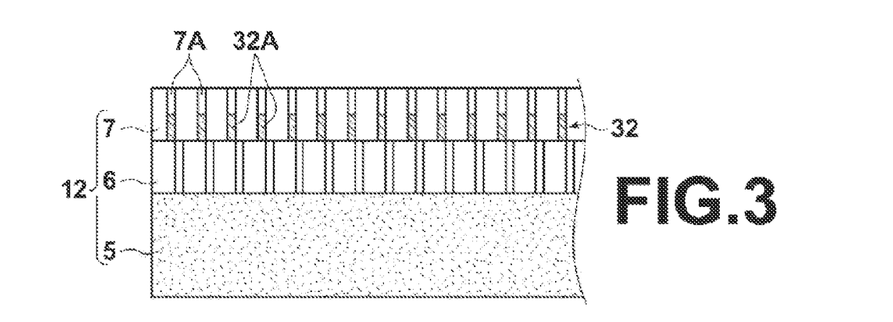
FIG. 3 illustrates a production step of the composite for acid gas separation following FIG. 2.

In the initial layer forming step, the prepared forming coating liquid for the acid gas separation facilitated transport membrane is coated first on the surface of the hydrophilic porous film 7 of the porous support 12 with a liquid film thickness $t_{11}$ of 0.3 mm to 1.0 mm, as shown in FIG. 2. From immediately after the coating, the liquid 31 infiltrates into the pores 7A of the hydrophilic porous film 7 and, thereafter, acid gas separation facilitated transport sections 32A are formed in the individual pores 7A of the hydrophilic porous film 7 by drying, as illustrated in FIG. 3. The facilitated transport section 32A formed in each pore 7A constitutes a facilitated transport membrane 32 as a whole. That is, the facilitated transport membrane 32 is formed in the hydrophilic porous film 7 and the facilitated transport membrane 32 is not a continuous single membrane but is constituted by a many facilitated transport sections 32A. Note that the coating liquid does not infiltrate into the pores of the hydrophobic porous film 6 having the foregoing pore diameter, as long as the coating liquid has the foregoing viscosity.

As illustrated in FIG. 2, after being coated on the surface of the hydrophilic porous film 7, the coating liquid replaces the air in the pores and infiltrates into the pores while discharging bubbles to the surface. Here, an excessive amount of coated liquid causes the liquid to be dried before the air is completely deflated since the air requires time to come out on the surface whereby bubbles may possibly be mixed in the acid gas separation facilitated transport sections 32A. But, as the coating liquid is coated on the surface with a liquid film thickness of less than or equal to 1 mm in the present disclosure, facilitated transport sections 32A (that is, facilitated transport membrane 32) sufficiently prevented the mixing of bubbles may be formed. From the viewpoint of preventing the mixing of bubbles, the liquid film thickness at the time of coating may be less than or equal to 1 mm with no lower limit. On the other hand, from the viewpoint of obtaining a thick facilitated transport membrane, a too thin initial layer necessitates an increase in the number of times for the next layer forming step to make the facilitated transport membrane have a sufficient thickness. A liquid film thickness greater than or equal to 0.3 mm at the time of coating the initial layer is preferable because it allows a thick facilitated transport membrane to be obtained efficiently.

In the initial layer forming step, the thickness of the liquid film at the time of coating is preferably 0.3 mm to 0.7 mm, and more preferably 0.3 mm to 0.6 mm from the viewpoint of absence of bubbles by allowing the coating liquid to infiltrate sufficiently into the hydrophilic porous film and from the view point of manufacturing efficiency.

The liquid film thickness as used herein refers basically to the value set on the coating equipment (coater) side. Since the coating liquid is coated on a porous film which is hydrophilic on the surface, the coating liquid infiltrates into the pores of the porous film immediately after the coating and, therefore, the liquid film thickness set by the coating equipment is not already maintained from immediately after the coating.

In the drying step, the coated liquid is dried in a drying furnace to form an acid gas separation facilitated transport membrane. The term "drying" as used herein refers to remove at least some of the water contained in the liquid film of the forming coating liquid for the acid gas separation facilitated transport membrane formed on the support in the coating step. The temperature of the drying oven is preferably set to a value in the range from 60 to 120° C., as appropriate. A temperature higher than or equal to 60° C. may keep the drying time within a practical time. On the other hand, the high temperature limit may be primarily determined according to the heat resistance of the support and it is set to about 120° C. here.

From the stability of the film surface, the temperature of the drying furnace is preferably 60 to 90° C. and more preferably 70 to 80° C. Various types of drying methods, such as the drying method by hot air, drying method by infrared heater, and the like may be employed as the drying method. The temperature in the drying furnace may not be uniform as long as it is 60 to 120° C. In order to reduce defects due to surface film formation during drying, the temperature of the initial drying zone is preferably set to lower than that of the late drying zone. Further, it is more preferable that the temperature be set so as to gradually increase from the drying furnace inlet side toward the drying furnace exit (outlet) side. For example, near the drying furnace inlet, which is the initial drying zone, may be set to 60° C., near the center of the drying furnace, which is the intermediate drying zone, may be set to 70° C., and near the drying furnace outlet, which is the late drying zone, may be set to 90° C.

—Next Layer Forming Step—

Figure 4:
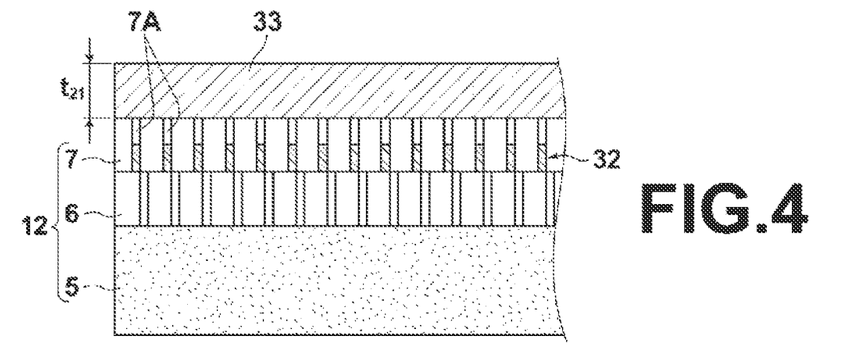
FIG. 4 illustrates a production step of the composite for acid gas separation following FIG. 3.
Figure 5:
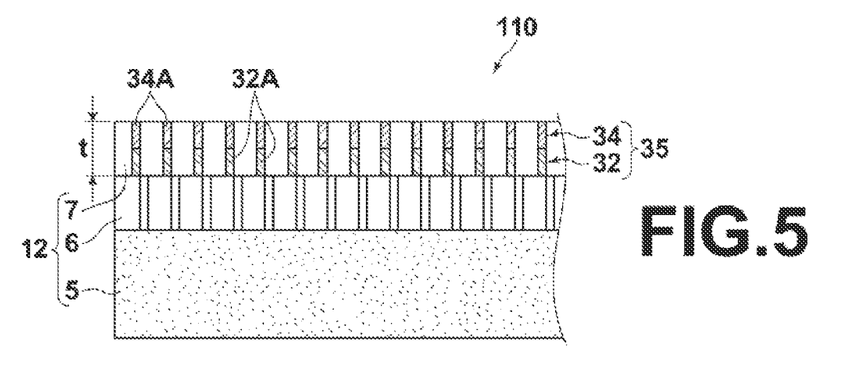
FIG. 5 illustrates a production step of the composite for acid gas separation following FIG. 4.

In the next layer forming step, the forming coating liquid for the acid gas separation facilitated transport membrane is coated on the surface of the hydrophilic porous film 7 with the previously formed acid gas separation facilitated transport membrane 32, as illustrated in FIG. 4. The coated coating liquid 33 infiltrates into the pores 7A of the hydrophilic porous film 7 at this time also, and acid gas separation facilitated membrane sections 34A are formed on the previously formed acid gas separation facilitated transport sections 32A in the individual pores 7A of the hydrophilic porous film 7 by drying as illustrated in FIG. 5. The facilitated transport section 34A formed in each pore 7A constitutes a facilitated transport membrane 34 as a whole. If the amount of the coating liquid 33 exceeds the remaining air gap in the hydrophilic porous film 7, the facilitated transport membrane 34 formed in the next layer forming step may be composed of the facilitated transport sections 34A formed by infiltrated into the pores 7A and a facilitated transport membrane 34B formed on the surface of the porous membrane 7, as illustrated in FIG. 6.

The next layer forming step is performed once or more times after the initial layer forming step. The next layer forming step may be performed only once or repeated two or more times. That is, the next layer forming step may be repeated further on the surface of the hydrophilic porous film 7 with the acid gas separation facilitated transport membrane 34 illustrated in FIG. 5 or FIG. 6. In a case where the next layer forming step is performed a plurality of times, the coating liquid film thickness, drying conditions, and the like may be identical or different. In a case where the support with the facilitated transport membrane is formed thereon is required to be wound on a winding roll by the roll-to-roll method, however, the coated surface generally comes in contact with a conveyor roll in the next layer forming step, and therefore the facilitated transport membrane needs to be dried until the moisture content thereof is reduced to about 20% or less to avoid a problem, such as deformation of the facilitated transport membrane or sticking a portion of the membrane to the conveyor roll when the membrane comes in contact with the roll. Here, the moisture content is a value calculated by a formula given below when the mass of the facilitated transport membrane of 10 cm square under a dew point of −20° C. is taken as A and the mass of the facilitated transport membrane of 10 cm square under the environment of 25° C. with a relative humidity of 20% is taken as B:

$$(B-A) \div B \times 100.$$

Figure 6:
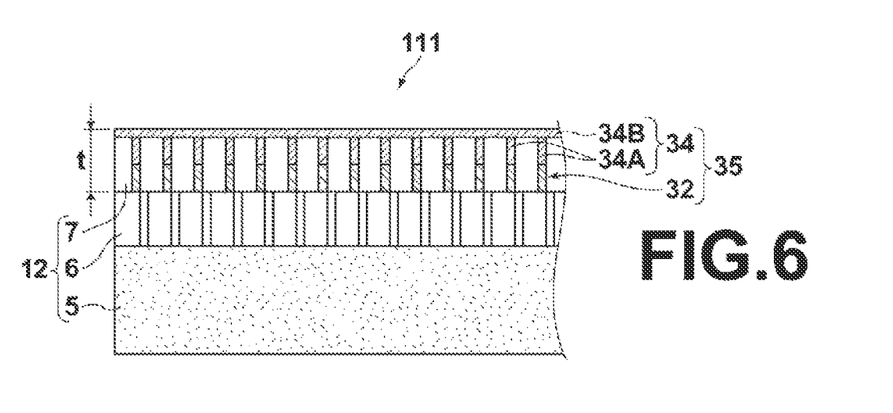
FIG. 6 is a cross-sectional view of a composite for acid gas separation according to a design modification.

A composite for acid gas separation 110 composed of the support 12 with an acid gas separation facilitated transport membrane 35 formed thereon as shown in FIG. 5 or a composite for acid gas separation 111 shown in FIG. 6 may be obtained through the next layer forming step performed once or a plurality of times. The thickness t of the acid gas separation facilitated transport membrane 35 constituted by a plurality of layers is preferably 40 μm to 100 μm under the environment of 25° C. 30% RH.

In the next layer forming step, the thickness $t_{21}$ of a liquid film to be coated is preferably less than or equal to 3.0 mm. Limiting the thickness $t_{21}$ less than or equal to 3.0 mm may prevent occurrence of surface skin burrs in the drying step, and a film having a smooth surface may be obtained. As it is possible to efficiently manufacture a facilitated transport membrane having a sufficient thickness and to obtain a good membrane, the thickness of the liquid film to be coated in the next layer forming step is preferably 2.0 mm to 3.0 mm. Note that there may be a case where a thin liquid film of about 0.3 mm may be coated in the next layer forming step for thickness adjustment.

The drying in the next layer forming step is similar to that in the initial layer forming step, but if a liquid film having a thickness greater than 1.0 mm which is thicker than that of the initial layer is formed in the next layer forming step, drying failures, such as mottling and unevenness, are likely to occur on the surface by performing rapid drying. Therefore, the drying in the next layer forming step is preferably performed at a temperature lower than that of the drying in the initial layer forming step.

According to the method of producing a composite for acid gas separation of the present disclosure, a thick acid gas separation composite membrane may be obtained, since the acid gas separation facilitated transport membrane is formed through a plurality of times of coating and drying. Provision of the thick acid gas separation facilitated transport membrane allows the gas permeability of a gas contained in a feed gas (raw gas) other than a predetermined acid gas to be reduced sufficiently.

A composite for acid gas separation with a thick acid gas separation facilitated transport membrane with less film defect may be produced by a method of high production efficiency and low production cost through roll-to-roll manufacturing apparatus that uses a strip-like (web-like) support.

In the foregoing, the description has been made as an embodiment in which one kind of coating liquid is prepared in the preparation step of forming coating liquid for the acid gas separation facilitated transport membrane and the same coating liquid is coated a plurality of times. But, a plurality of forming coating liquids having different concentrations of the acid gas carrier may be prepared in the forming coating liquid preparation step and a next layer acid gas separation facilitated transport membrane may be formed using a forming coating liquid having lower concentration of the acid gas carrier than that of the forming coating liquid used for the previously formed acid gas separation facilitated transport membrane in the next layer forming step. If a metal carbonate is used as the acid gas carrier, the acid gas separation facilitated transport membrane contains a large amount of metal carbonate. Therefore, crystals of metal carbonate are likely to deposit on the surface of even a dried membrane due to slight moisture in the membrane or a change in the water content due to temperature and humidity changes during storage of the membrane. Thus, it is preferable to lower the carrier concentration of the film formed on the top layer by coating, as it is able to temporally delay the deposition of the carrier accelerator on the surface.

Further, a plurality of forming coating liquids having different hydrophilic compounds may be prepared as the forming coating liquid for the acid gas separation facilitated transport membrane in the coating liquid preparation step, and a next layer acid gas separation facilitated transport membrane may be formed using a forming coating liquid which differs in hydrophilic compound from the forming coating liquid used for the previously formed acid gas separation facilitated transport membrane in the next layer forming step. For example, if the hydrophilic compound of the forming coating liquid for the first acid gas separation facilitated transport membrane is a polyvinyl alcohol-polyacrylic acid copolymer, a hydrophilic compound containing a polyvinyl alcohol-polyacrylic acid copolymer with a different copolymerization ratio as the forming coating liquid for the acid gas separation facilitated transport membrane of the next layer.

Note that forming coating liquids having different additive amounts, such as a thickener, an additive, or the like, may be prepared in the preparation step of forming coating liquid for the acid gas separation facilitated transport membrane, and different forming coating liquids may be used at the time of forming the first acid gas separation facilitated transport membrane and at the time of forming the next layer acid gas separation facilitated transport membrane. Further, forming coating liquids which differ in two or more of the concentration of acid gas carrier, the concentration of hydrophilic compound, and the concentration of additive amount, such as a thickener, an additive, or the like, may be prepared, and different forming coating liquids may be used at the time of forming the first acid gas separation facilitated transport membrane and at the time of forming the next layer acid gas separation facilitated transport membrane. In a case where three or more layers of acid gas separation facilitated transport membranes are formed, the first and the second layers may be formed by the same forming coating liquid and the third layer may be formed by a different forming coating liquid.

<Apparatus for Producing Composite for Acid Gas Separation>

An apparatus for producing a composite for acid gas separation according to an embodiment of the present disclosure for implementing the method of producing a composite for acid gas separation of the present disclosure will be described using FIG. 7.

Figure 7:
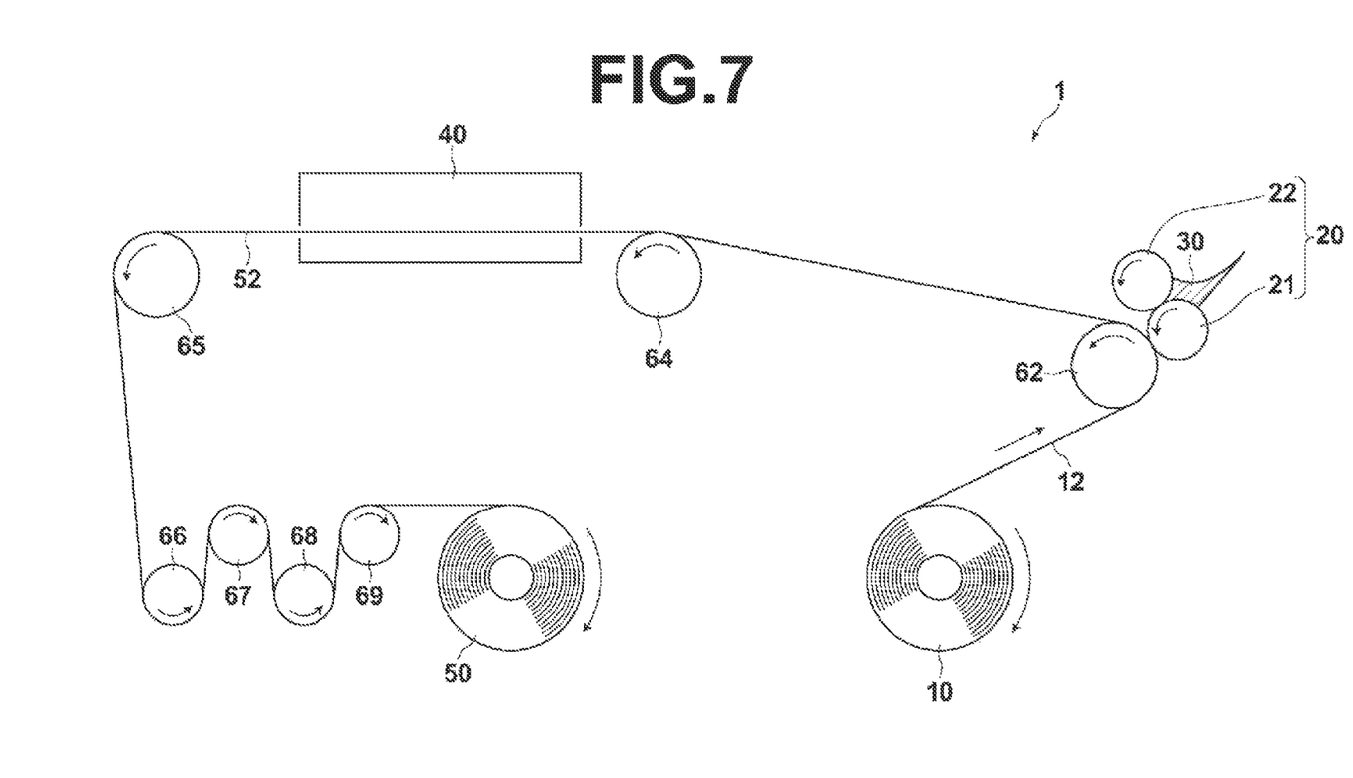
FIG. 7 is a schematic view illustrating an example configuration of manufacturing apparatus used for the method of producing a composite for acid gas separation according to the present disclosure.

FIG. 7 is a schematic view illustrating an example configuration of an apparatus used for the production process of a composite for acid gas separation according to the present disclosure. The apparatus 100 includes a feed roll 10 that feeds a strip-like support 12, a coating section having a coater 20 (in FIG. 7, a three-roll coater which includes an applicator roll 21 that rotates in the arrow direction in the drawing, a metering roll 22, and a backup roll 62 which also serves as a conveyor of the strip-like support 12), a drying section having a drying furnace 40 that dries a liquid film (not shown) of a coating liquid 30 formed on the support 12, and a winding process section having a winding roll 50 that winds an obtained acid gas separation composite 52. Further, conveyor rolls 62 (also serves as a backup roll of the roll coater, in FIG. 7), 64 to 69 for conveying the support 12 are provided in the respective sections 20, 40, and 50.

The use of the apparatus 100 having the foregoing configuration allows for roll-to-roll manufacturing in which the support 12 is fed from the feed roll 10, then a coating step and a drying step are performed sequentially, and the support with a facilitated transport membrane formed thereon (acid gas separation composite 52) is wound on the winding roll 50. In this way, the facilitated transport membrane may be formed continuously and efficiently.

The conveying speed of the support 12 depends on the type of the support 12, the viscosity of the composition (coating liquid), and the like. A too fast conveying speed of the support may possibly reduce the film thickness uniformity of the coating film in the coating step, while a too slow conveying speed reduces productivity. The conveying speed of the support 12 may be determined by considering the foregoing points and according the type of the support 12, the viscosity of the composition, and the like, but preferably greater than or equal to 1 m/min, and more preferably 5 m/min to 100 m/min.

The simplest method for implementing the initial layer forming step and the next layer forming step is to perform the initial layer forming step in the manufacturing apparatus 1 as shown in FIG. 7 and performing the next layer forming step by setting the once wound up roll article to the feeding side of the same coater again. Further, the next layer forming step may be performed without winding after the initial layer forming step using a coater equipped with a plurality of coating sections and drying furnaces.

In the manufacturing apparatus 1, a strip-like support 12 is fed from the feed roll 10 and conveyed to the coater 20 of the coating section, and the coating liquid is coated on the support 12 with a viscosity in the viscosity measurement value range from 0.5 Pa·s to 5.0 Pa·s in B-type viscosity measurement at a rotation speed of 60 rpm and at a temperature of 15° C. to 35° C. to provide a liquid film of the coating liquid on the support 12. If at least either one of the temperature and viscosity of the coating liquid in the coating step is out of the foregoing range, sedimentation may occur in the liquid film of the coating liquid, or the coating liquid 30 in the coater 20 of the coating apparatus may flow out or become difficult to be coated on the support due to deposition (salting out) of the hydrophilic polymer, or the film thickness variation may increase.

As the coater for coating the coating liquid according to the present disclosure, a roll coater or a blade coater is particularly preferable. With a single roll or a combination of a plurality of rolls, the roll coater controls the amount of coating liquid held on the surface of a roll disposed at a place closest to the support (applicator roll) and transfers a certain percentage amount of the coating liquid on the applicator roll to the surface of the support. Suitable roll coaters include direct gravure coater, offset gravure coater, single roll kiss coater, three reverse roll coater, positive rotation roll coater, and the like, and the three reverse roll coater suitable to coat coating liquids with medium to high viscosities of 0.5 Pa·s to 5.0 Pa·s measured in B-type viscosity measurement at a rotation speed of 60 rpm is preferable. The blade coater coats an excessive amount of coating liquid on the support and scrapes off an excess of the coating liquid on the support by a blade.

In the drying furnace 40 of the manufacturing apparatus 1, at least some of the water contained as a solvent in the coating film of the carbon dioxide separation layer forming coating liquid formed on the support in the coating step is removed. Such drying step is performed by heating the support that holds the coating film, blowing drying air onto the coating film, or by both. The temperature of the drying furnace is preferably set to 60° C. to 120° C., more preferably set to 60° C. to 90° C., and further preferably set to 70° C. to 80° C. to rapidly dry the liquid film of the coating liquid without causing deformation of the support.

As the surface of the formed facilitated transport membrane comes in contact with the rolls 67 and 69 of the conveyor rolls provided between the exit of the drying furnace 40 and the winding roll 50, the facilitated transport membrane needs to be dried to a degree such that no roll contamination occurs due to adherence of the facilitated transport membrane to the roll or no defect occurs in the surface of the facilitated transport membrane when the facilitated transport membrane comes in contact with the rolls. Note that in a roll-to-roll apparatus a conveyor roll which comes in contact with the coated surface is essential for absorbing the feeding and winding speeds (circumferential velocities) or controlling the tension.

Next, the acid gas separation facilitated transport membrane forming coating liquid will be described in detail.

In a preferred embodiment of the present disclosure, the coating step coats the acid gas separation facilitated transport membrane forming coating liquid is coated on the support with a viscosity in the viscosity measurement value range from 0.5 Pa·s to 5.0 Pa·s in B-type viscosity measurement at a rotation speed of 60 rpm and at a temperature of 15° C. to 35° C., and with a viscosity in the viscosity measurement value range from 1 Pa·s to 5.0 Pa·s in B-type viscosity measurement at a rotation speed of 60 rpm and at a temperature of 15° C. to 35° C. in a particularly preferred embodiment. This allows an acid gas separation facilitated transport membrane having a uniform film thickness without any defect, such as mixing of air bubbles and the like, to be obtained more easily and stably.

(Hydrophilic Compound)

The hydrophilic compound contained in the coating liquid may be a hydrophilic polymer. The hydrophilic polymer functions as a binder and holds moisture in the acid gas separation facilitated transport membrane to cause the acidic carrier to exhibit an acid gas separation function. From the viewpoint that the acid gas separation facilitated transport membrane preferably has high water absorption (retention), the hydrophilic polymer preferably has high water absorption. The hydrophilic polymer preferably has water absorption in terms of the amount of water absorption of physiological saline solution greater than or equal to 0.5 g/g, more preferably greater than or equal to 1 g/g, further preferably greater than or equal to 5 g/g, still further preferably greater than or equal to 10 g/g, and most preferably, greater than or equal to 20 g/g.

As the hydrophilic polymer contained in the coating liquid, known hydrophilic polymers may be used, and from the viewpoint of water absorption, film formability, strength, and the like, for example, polyvinyl alcohols, polyacrylic acids, polyethylene oxides, water-soluble celluloses, starches, alginic acids, chitins, polysulfone acids, polyhydroxy methacrylates, polyvinyl pyrrolidones, polyN-vinylacetamides, polyacrylamides, polyethyleneimines, polyallyl amines, polyvinyl amines, and the like are preferable. Further, copolymers of these may also be preferably used.

Polyvinyl alcohol-polyacrylate copolymer is particularly preferable. The polyvinyl alcohol-polyacrylate copolymer has a high hydrogel strength during high water absorption, as well as having a high water absorption capacity. The content rate of the polyacrylic acid in the polyvinyl alcohol-polyacrylate copolymer is, for example, 1 to 95 mol %, preferably 2 to 70 mol %, more preferably 3 to 60 mol %, and particularly preferably 5 to 50 mol %. As the polyacrylate, ammonium salts, organic ammonium salts and the like may be used, other than alkali metals, such as sodium salts, potassium salts, and the like.

Commercially available polyvinyl alcohol-polyacrylate copolymers (sodium salt) include, for example, Kurasutoma AP20 (trade name, manufactured by Kuraray Co., Ltd.). Further, two or more hydrophilic polymers may be mixed and used.

Although depending on the type used, the content of the hydrophilic polymer in the coating liquid is preferably 0.5 mass % to 50 mass %, more preferably 1 mass % to 30 mass %, and particularly preferable 2 mass % to 15 mass %, from the viewpoint of forming a film as the binder to allow the acid gas separation facilitated transport membrane to sufficiently retain moisture.

(Acid Gas Carrier)

The acid gas carrier refers to a substance indirectly or directly reacts with an acid gas. As the acid gas carrier, various water-soluble inorganic and organic substances that exhibit basicity are used. Substances that indirectly react with an acid gas may include, for example, a substance that reacts with other gases contained in the feed gas to exhibit basicity and the basic compound reacts with an acid gas. More specifically, it refers to an alkali metal compound capable of selectively taking $CO_2$ in the membrane by reacting with steam to release $OH^-$ and causing the $OH^-$ to react with $CO_2$. Substances that directly react with an acid gas may include, for example, nitrogen-containing compounds and sulfur oxides which themselves exhibit basicity.

The alkali metal compound may be at least one kind selected from alkali metal carbonates, alkali metal bicarbonates, and alkali metal hydroxides. Here, an alkali metal element selected from cesium, rubidium, potassium, lithium, and sodium is preferably used as the alkali metal. The term "alkali metal compound" as used herein refers to, in addition to an alkali metal itself, those containing the salt or ion thereof.

The alkali metal carbonates may include, for example, lithium carbonate, sodium carbonate, potassium carbonate, rubidium carbonate, and cesium carbonate. The alkali metal bicarbonates may include, for example, lithium hydrogen carbonate, sodium hydrogen carbonate, potassium hydrogen carbonate, rubidium hydrogen carbonate, cesium hydrogen carbonate. The alkali metal hydroxides may include, for example, lithium hydroxide, sodium hydroxide, potassium hydroxide, cesium hydroxide, rubidium hydroxide, and the like. Among these, alkali metal carbonates are preferable, and a compound containing high water-soluble cesium, rubidium, or potassium is preferable. Further, two or more kinds of acid gas carriers may be mixed and used. A mixture of cesium carbonate and potassium carbonate may be cited as a preferable example.

As for the nitrogen-containing compounds, for example, amino acids, such us glycine, alanine, serine, proline, histidine, taurine, and diaminopropionic acid, hetero compounds, such as pyridine, histidine, piperazine, imidazole, and triazine, alkanolamines, such as monoethanolamine, diethanolamine, triethanolamine, monopropanolamine, dipropanolamine, tripropanolamine, cyclic polyether amines, such as cryptand [2.1], cryptand [2.2], bicyclic polyether amines, such as cryptand [2.2.1], cryptand [2.2.2], Porphyrins, phthalocyanines, ethylenediaminetetraacetic acids, and the like may be used. As for the sulfur oxides, for example, amino acids, such as cysteine and cystine, polythiophenes, dodecylthiols, and the like may be used.

Although depending on the type used, the content of the acid gas carrier in the coating liquid is preferably 0.3 mass % to 30 mass %, more preferably 0.5 mass % to 25 mass %, and particularly preferable 1 mass % to 20 mass % to prevent salting out prior to coating and to ensure steady exertion of the acid gas separation function.

The coating liquid preferably includes a hydrophilic polymer and an acid gas carrier with a mass ratio in the range of 1:9 to 2:3, more preferably in the range of 1:4 to 2:3, and further preferably in the range of 3:7 to 2:3.

(Thickener)

In order to control the viscosity of the acid gas separation facilitated transport membrane forming coating liquid composition composed of a hydrophilic polymer, an acid gas carrier, and water, in which the hydrophilic polymer and the acid gas carrier are contained with a mass ratio of 1:9 to 2:3, in the temperature range of 15° C. to 35° C., a thickener may further be used in the coating liquid composition. As for the thickener, any compound may be used as long as it is capable of increasing the viscosity of the coating liquid composition in the temperature range of 15° C. to 35° C. For example, polysaccharide thickeners, such as agars, carboxymethyl celluloses, carrageenans, xanthan gums, guar gums, pectins, and the like, are preferable, and from the viewpoint of film formability, ease of availability, and cost, carboxymethyl celluloses are preferable. A carboxymethyl cellulose that may be suitably used has an etherification degree in the range of 0.6 to 1.5 and a viscosity measurement value in the range of 1 Pa·s to 10 Pa·s in B-type viscosity measurement at a rotation speed of 60 rpm when it is made into a 1 wt % solution. The use of such arboxymethyl cellulose, with a small content, allows an acid gas separation facilitated transport membrane forming coating liquid composition having a desired viscosity to be obtained easily, and may reduce the possibility that at least some of the components other than the solvent included in the coating liquid is not dissolved in the coating liquid and deposited. Such arboxymethyl cellulose may be obtained from commercial products, and CMC2280 of Daicel FineChem Co., Ltd may be cited as a preferable example.

The content of the thickener in the composition (coating liquid) is preferably as less as possible, as long as it is possible to control the viscosity of the composition so as to exhibit any viscosity at any temperature in the range of 15° C. to 35° C. in the viscosity measurement value range of 0.5 Pa·s to 5.0 Pa·s in n B-type viscosity measurement at a rotation speed of 60 rpm. As a general indication, the content is preferably less than or equal to 10 mass %, more preferably 0.1 mass % to 5 mass %, and most preferably 0.1 mass % to 2 mass %.

(Cross-Linking Agent)

Cross-linking of the hydrophilic polymer may be carried out by known methods, such as thermal cross-linking, UV cross-linking, electron beam cross-linking, radiation cross-linking, and the like. The composition of the present disclosure preferably includes a cross-linking agent. In particular, the composition preferably includes a cross-linking agent that reacts with a polyvinyl alcohol-acrylate copolymer and has two thermally cross-linkable functional groups, examples of which may include polyglycidyl ethers, polyhydric alcohols, polyvalent isocyanates, polyvalent aziridines, haloepoxy compounds, polyvalent aldehydes, polyvalent amines, and the like.

The foregoing polyglycidyl ethers may include, for example, ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol poly glycidyl ether, propylene glycol glycidyl ether, polypropylene glycol diglycidyl ether, and the like.

The foregoing polyhydric alcohols may include, for example, ethylene glycol, diethylene glycol, triethylene glycol, tetraethylene glycol, polyethylene glycol glycerin, polyglycerin, propylene glycol, diethanolamine, triethanolamine, polyoxy propyl, oxyethyleneoxypropylene block copolymer, pentaerythritol, sorbitol, and the like.

The foregoing polyvalent isocyanates may include, for example, 2,4-toluylene diisocyanate, hexamethylene diisocyanate, and the like. The foregoing polyvalent aziridines may include, for example, 2,2-bis-hydroxymethyl butanoltris [3-(1-aziridinyl) propionate], 1,6-hexamethylene diethylene urea, diphenylmethane-4,4'-bis N, N'-diethylene urea, and the like.

The foregoing haloepoxy compounds may include, for example, epichlorohydrin, α-methyl chlorohydrin, and the like. The foregoing polyvalent aldehydes may include, for example, glutaraldehyde, glyoxal, and the like. The foregoing polyvalent amines may include, for example, ethylenediamine, diethylenetriamine, triethylenetetramine, tetraethylenepentamine, pentaethylenehexamine, polyethyleneimine, and the like. Among the foregoing cross-linking agents, glutaraldehyde is particularly preferable as the thermal cross-linking agent for the polyvinyl alcohol-acrylate copolymer.

(Other Components)

The coating liquid may include one or more other components (additives) than the hydrophilic polymer, the acid gas carrier, and the thickener. Examples of other components may include, other than the cross-linking agent, a surfactant, a catalyst, a moisturizing (water absorbing) agent, auxiliary solvent, film strength control agent, and defect detection agent. Hereinafter, a specific acid gas separation module that employs a composite for acid gas separation produced by the production method of the present disclosure will be described.

<Spiral-Type Acid Gas Separation Module>

Figure 8:
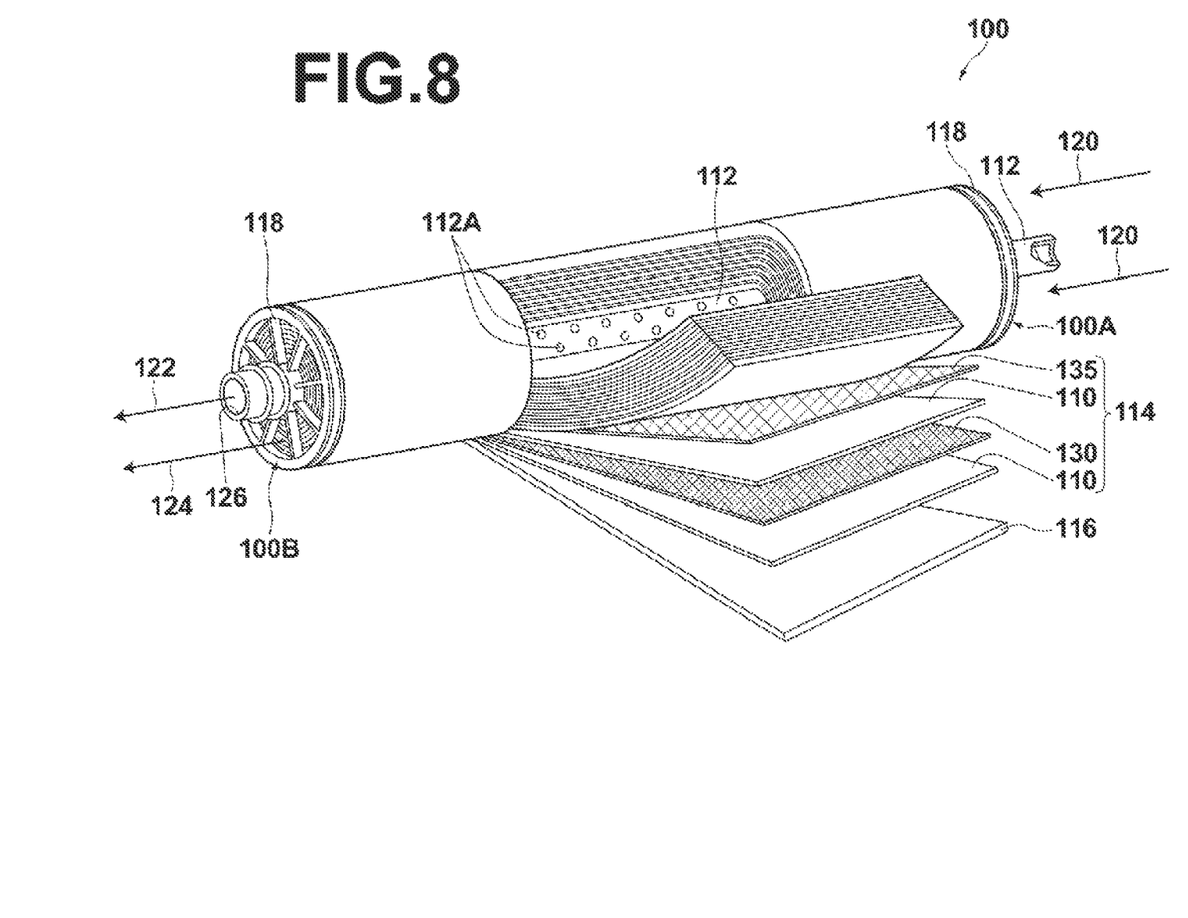
FIG. 8 is a partially cutout schematic configuration diagram, illustrating one embodiment of an acid gas separation module to which the composite for acid gas separation produced by the production method of the present disclosure is applied.

FIG. 8 is a partially cutout schematic configuration diagram of a spiral-type acid gas separation module 100, which is a first embodiment of the acid gas separation module of the present disclosure.

As shown in FIG. 8, the acid gas separation module 100 is configured, as its basic structure, such that a single or a plurality of layered bodies 114 (to be described later) is wound around a permeate gas collecting pipe 112 with the outermost thereof being covered with a cover layer 116, and a telescope prevention plate 118 is attached to each side of these units. When a raw gas 120 containing an acid gas is fed to the layered body 114 from one end 100A, the module 100 having such configuration separates the raw gas 120 into an acid gas 122 and a residual gas 124 and discharges them separately to the other end side 100B by the configuration of the layered body 114.

The permeate gas collecting pipe 112 is a cylindrical tube with a plurality of through holes 112A formed in the tube wall. One tube end side (one end 100A side) of the permeate gas collecting pipe 112 is closed, and the tube other end side (other end 100B side) is open, serving as a discharge outlet 126 through which the acid gas 122, such as carbon dioxide, permeated through the layered body and collected from the through-holes 112A is discharged.

There is not any specific restriction on the shape of the through-hole 112A, but a circular hole of 1 to 20 mm$\phi$ is preferable. Further, the through-holes 112A are preferably disposed uniformly with respect to the surface of the permeate gas collecting pipe 112.

The cover layer 116 is formed of a blocking material capable of blocking the row gas 120 passing through the acid gas separation module 100. Further, the blocking material preferably has heat-moisture resistance. The "heat resistance" of the heat-moisture resistance refers to having heat resistance of greater than or equal to 80° C. More specifically, the heat resistance of greater than or equal to 80° C. refers to that, after being exposed to a condition of a temperature greater than or equal to 80° C. for two hours, the blocking material maintains the shape before the exposure and no visually recognizable curl due to heat shrink or thermal fusion occurs. The "moisture resistance" of the heat-moisture resistance refers to that, after being exposed to a condition of 40° C.80% RH for two hours, the blocking material maintains the shape before the exposure and no visually recognizable curl due to heat shrink or thermal fusion occurs. The telescope prevention plate 118 is preferably formed of a heat-moisture resistant material.

The layered body 114 includes a permeate gas flow channel member 135, a composite for acid gas separation 110, a feed gas flow channel member 130, and a composite for acid gas separation 110 and one or more such layered bodies 114 are wound around the permeate gas collecting pipe 112. Layering these films allows a raw gas 120 containing an acid gas 122 is fed from an end of the feed gas flow channel member 130, the acid gas 122 separated by permeating through the composite for acid gas separation 110 partitioned by the cover layer 116 is accumulated in the permeate gas collecting pipe 112 through the permeate gas flow channel member 135 and through-holes 112A and collected from the discharge outlet 126 connected to the permeate gas collecting pipe 112. In addition, a residual gas 124 passed through an air gap of the feed gas flow channel member 130 and the like and from which the acid gas 122 has been separated is discharged from an end of the composite for acid gas separation 110.

The composite for acid gas separation 110 is produced by the production method of the present disclosure and includes a porous support formed by layering in the order of a hydrophilic porous film, a hydrophobic porous film, and an auxiliary support film, and an acid gas separation facilitated transport membrane which includes at least a hydrophilic polymer and an acid gas carrier that reacts with an acid gas in a raw gas.

There is not any specific restriction on the number of the layered bodies 114 wound around the permeate gas collecting pipe 112, and may be single or plural, but increase in the number (number of layers) may increase the membrane area of the facilitated transport membrane. This may increase the amount of acid gas 122 to be separated by one module. Further, the length of the layered body 114 may be increased to increase the membrane area.

(Feed Gas Flow Channel Member)

The feed gas flow channel member 130 is a member to which a raw gas containing an acid gas is fed from one end of the acid gas separation module, and has a function of a spacer. Since it is preferable to cause turbulence in the raw gas, a net-like member is preferably used for the feed gas flow channel member 130. As the flow channel of the gas changes depending on the shape of the net, the shape of the unit cell of the net is selected, for example, from a rhombic, a parallelogram, and the like according to the purpose. Considering that the high temperature raw gas containing water vapor is fed, the feed gas flow channel member preferably has moisture-temperature resistance as in the acid gas separation layer.

There is not any specific restriction on the material of the feed gas flow channel member 130, and example materials may include paper, fine paper, coat paper, cast coated paper, synthetic paper, resin materials, such as cellulose, polyester, polyolefin, polyamide, polyimide, polysulfone, aramid, and polycarbonate, inorganic materials, such as metal, glass, and ceramic. Preferable resin materials may include polyethylene, polystyrene, polyethylene terephthalate, polytetrafluoroethylene (PTFE), polyether sulfone (PES), polyphenylene sulfide (PPS), polysulfone (PSF), polypropylene (PP), polyimide, polyether imide, polyetheretherketone, polyvinylidene fluoride, and the like.

Preferable materials from the viewpoint of moisture-temperature resistance may include inorganic materials, such as ceramic, glass, and metal, and organic resin materials having a heat resistance of greater than or equal to 100° C., and high molecular weight polyesters, polyolefins, heat-resistant polyamides, polyimides, polysulfones, aramids, polycarbonates, metals, glasses, ceramics, and the like are preferably used. More specifically, the feed gas flow channel member 130 preferably includes at least one type of material selected from the group consisting of ceramics, polytetrafluoroethylenes, polyvinylidene fluorides, polyethersulfones, polyphenylene sulfides, polysulfones, polyimides, polypropylenes, polyetherimides, and polyetheretherketones.

There is not any specific restriction on the thickness of the feed gas flow channel member, and the thickness is preferably 100 μm to 1000 μm, more preferably 150 μm to 950 μm, and further preferably 200 μm to 900 μm.

(Permeate Gas Flow Channel Member)

The permeate gas flow channel member 135 is a member through which an acid gas reacted with the carrier and permeated through the composite for acid gas separation 110 flows toward the through-holes. The permeate gas flow channel member 135 has a function of a spacer. It also has a function to flow the permeated acid gas to the inner side of the permeate gas flow channel member 135. For example, a tricot knit shape may be cited as an example. As for the materials of the permeate gas flow channel member, identical materials to those of the feed gas flow channel member may be used. Considering that the high temperature raw gas containing water vapor is fed, the permeate gas flow channel member preferably has moisture-temperature resistance as in the acid gas separation layer.

Specific materials which may preferably be used for the permeate gas flow channel member include polyester series such as epoxy impregnated polyesters, polyolefin series, such as polypropylenes, and fluorine series such as polytetrafluoroethylene.

There is not any specific restriction on the thickness of the permeate gas flow channel member, and the thickness is preferably 100 μm to 1000 μm, more preferably 150 μm to 950 μm, and further preferably 200 μm to 900 μm.

The acid gas separation module may set the composite for acid gas separation produced by the production method of the present disclosure as a flat membrane, or may use by processing into a spiral type known as a reverse osmosis membrane module or a pleat-type having a shape as described, for example, in Japanese Unexamined Patent Publication No. 2010-279885. Further, the acid gas separation module according to the present disclosure may be set in an acid gas separation apparatus and used.

EXAMPLES

Hereinafter, the present disclosure will be described more specifically by way of examples.

(Support)

A layer body of a hydrophilic porous film (Gore-Tex: SMO-0.05) and a layered body (supported PTFE) of a hydrophobic support polytetrafluoroethylene (PTFE), which is a porous film with a pore diameter of 0.05 μm, and a fabric of polytetrafluoroethylene, as an auxiliary support film, was provided as a support.

(Preparation Step)

A carbon dioxide separation coating liquid was prepared by heating and stirring an aqueous solution of 6% cesium carbonate, 2.5% PVA-PAA copolymer (Kuraray; Kurasutoma AP), and 0.025% glutaraldehyde (manufactured by Wako Pure Chemical Industries, Ltd.) The carbon dioxide separation coating liquid was poured into a stainless container (e.g., inner diameter 4 cm, height 12 cm) such that a viscometer cylinder (rotor) was sufficiently immersed in the coating liquid, and the stainless container was immersed into a temperature-controllable water bath to adjust the temperature of the liquid to 25° C. While adjusting, a B-type viscometer (BL2 1~100,000 mPa·s/KN3312481, manufactured by Tech Jam Co., Ltd.) was operated and the viscosity at 60 rpm was measured according to JIS Z 8803. As the result, the viscosity of the carbon dioxide separation coating liquid was 1.1 Pa·s (1100 cp).

(Coating and Drying Step)

An initial layer forming step and a next layer forming step were performed sequentially with a use of a roll-to-roll coater having a coating section and a drying section. Note that, here, the next layer forming step was performed once. The coating was performed by blade coating method and a desired liquid film was coated by controlling the height of the blade. At this time, the width of the porous support was 500 mm with a coating width of 470 mm. A coater with a drying furnace having three drying zones (each being 8 m, total 24 m) was used and the coating speed (feed speed) was set to 5 m/min. The temperatures of the drying zones were set to 60° C., 80° C., and 90° C. in order from the feed side.

The following Examples 1 to 3 and Comparative Examples 1 and 2 were implemented by changing the thickness of the liquid film to be coated.

Example 1

A liquid film of the first layer (initial layer) was coated with a thickness of 0.3 mm by adjusting the height of the blade, as an initial layer forming step, then the liquid film was dried in the foregoing drying furnace, and a carbon dioxide separation facilitated transport membrane was formed within the hydrophilic porous film. After winding, the support was set to the feeding section again. The coating liquid was coated on the carbon dioxide separation layer such that the thickness of the liquid film becomes 2.0 mm by adjusting the height of the blade, as the next layer forming step and, thereafter, the liquid film was dried as in the initial layer forming.

Example 2

A composite for carbon dioxide separation was obtained through coating and drying by adjusting the height of the blade such that the thickness of the liquid film of the first layer and the thickness of the liquid film of the second layer (next layer) in Example 1 become 1.0 mm and 1.0 mm respectively.

Example 3

A composite for carbon dioxide separation was obtained through coating and drying by adjusting the height of the blade such that the thickness of the liquid film of the first layer and the thickness of the liquid film of the second layer (next layer) in Example 1 become 1.0 mm and 3.0 mm respectively.

Comparative Example 1

A composite for carbon dioxide separation was obtained through coating and drying by adjusting the height of the blade such that the thickness of the liquid film of the first layer becomes 3.0 mm. Here, only one coating and drying step was performed without forming a next layer.

Comparative Example 2

A composite for carbon dioxide separation was obtained through coating and drying by adjusting the height of the blade such that the thickness of the liquid film of the first layer and the thickness of the liquid film of the second layer (next layer) in Example 1 become 2.0 mm and 2.0 mm respectively.

[Evaluation Method]

The surface states of the facilitated transport membrane after coating and drying the first and second layers and process suitability at the time of coating the first and second layers were examined to evaluate each example. For the process suitability, presence or absence of contamination, such as film adhesion, on the contact surface of a conveyor roll on which the coated surface comes in contact (touch roll). The surface states of the facilitated transport membrane and contamination states of the contact surface of the roll were visually examined. The results are shown in Table 1.

TABLE 1

|  | Example 1 | Example 2 | Example 3 | Comparative Example 1 | Comparative Example 2 |
|---|---|---|---|---|---|
| First Layer Liquid Film Thickness | 0.3 mm | 1.0 mm | 1.0 mm | 3.0 mm | 2.0 mm |
| Second Layer Liquid Film Thickness | 1.0 mm | 1.0 mm | 3.0 mm | — | 2.0 mm |
| Separation Layer Surface State after First Layer Coating and Drying | Good | Good | Good | Many Entrained Bubbles | Some Entrained Bubbles |
| Separation Layer Surface State after Second Layer Coating and Drying | Good | Good | OK Level though Patchy Pattern on Coated Surface | — | Strong Uneven Drying and Surface Unevenness |
| Process Suitability at the Time of First Layer Coating | Good | Good | Good | — | Good |
| Process Suitability at the Time of Second Layer Coating | Good | Good | Slightly Cloudy Roll before Winding | — | Many Roll Contaminants before Winding |
| Judgement | A | A | B | C | C |

Evaluation of each of Examples 1 and 2 was good, showing that the production method was good (A). Example 3 was judged as usable (B) since a sufficiently usable composite was obtained, although some contaminants were observed on the roll at the time of forming the second layer. In the meantime, many bubbles were mixed in Comparative Example 1, while uneven drying and surface unevenness were observed on the membrane surface after the second coating and drying, with roll contamination, in Comparative Example 2. Therefore, Comparative Examples 1 and 2 were judged as not usable (C).

What is claimed is:

1. A method of producing a composite for acid gas separation with an acid gas separation facilitated transport membrane having a function of separating an acid gas in a raw gas on a porous support, the method comprising:
   a coating liquid preparation step in which a forming coating liquid for the acid gas separation facilitated transport membrane is prepared, the forming coating liquid including a hydrophilic compound, an acid gas carrier, and water;
   an initial layer forming step in which a first acid gas separation facilitated transport membrane is formed by coating the forming coating liquid, using a layered film layered in the order of a hydrophilic porous film, a hydrophobic porous film, and an auxiliary support film as the porous support, on a surface of the hydrophilic porous film of the layered film with a liquid film thickness of 0.3 mm to 1.0 mm and drying the coated coating liquid; and
   a next layer forming step in which a next acid gas separation facilitated transport membrane is formed by further coating the forming coating liquid for the acid gas separation facilitated transport membrane on the surface of the hydrophilic porous film with the previously formed acid gas separation facilitated transport membrane and drying the coated coating liquid, the next layer forming step being performed one or more times,
   wherein the forming coating liquid for the acid gas separation facilitated transport membrane has a temperature of 15° C. to 35° C. at the time of coating and a viscosity measurement value of 0.5 Pa·s to 5 Pa·s in B-type viscosity measurement at a rotation speed of 60 rpm,
   wherein, in the coating liquid preparation step, a plurality of forming coating liquids which differ in concentration of the acid gas carrier is prepared as the forming coating liquid for the acid gas separation facilitated transport membrane, and
   wherein, in a next layer forming step, a forming coating liquid which has a concentration of the acid gas carrier lower than that of the forming coating liquid used for the previously formed acid gas separation facilitated transport membrane is used.

2. The method of producing a composite for acid gas separation of claim 1, wherein the forming coating liquid for the acid gas separation facilitated transport membrane is coated with a liquid film thickness of less than or equal to 3.0 mm in the next layer forming step.

3. The method of producing a composite for acid gas separation of claim 1, wherein a roll coating method or a blade coating method is used to perform at least one of the coating in the initial layer forming step or the coating in the next layer forming step.

4. The method of producing a composite for acid gas separation of claim 1, wherein the hydrophilic compound is a polyvinyl alcohol-polyacrylic acid copolymer.

5. The method of producing a composite for acid gas separation of claim 1, wherein the acid gas carrier includes a compound containing at least one selected from alkali metal carbonates.

* * * * *